United States Patent [19]
Yano et al.

[11] Patent Number: 4,527,586
[45] Date of Patent: Jul. 9, 1985

[54] STRUCTURAL KIT FOR THE INSTALLATION OF A FLOW REGULATOR VALVE

[75] Inventors: Masatoshi Yano; Kiyoshi Hamamoto, both of Suita, Japan

[73] Assignee: Yano Giken Co., Ltd., Japan

[21] Appl. No.: 568,947

[22] Filed: Jan. 9, 1984

Related U.S. Application Data

[60] Continuation-in-part of Ser. No. 316,821, Oct. 30, 1981, abandoned, which is a division of Ser. No. 3,096, Jan. 12, 1979, abandoned.

[30] Foreign Application Priority Data

Sep. 25, 1978 [JP] Japan ................................ 53-118242

[51] Int. Cl.³ ............................................ F16L 41/04
[52] U.S. Cl. .................................. 137/318; 29/157 R; 82/4 C
[58] Field of Search ............. 137/315, 318; 29/157 R, 29/157.1 R; 82/4 C, 11, 46, 47

[56] References Cited

U.S. PATENT DOCUMENTS

| 587,091 | 7/1897 | French ................................ 137/315 |
| 587,108 | 7/1897 | Sherrerd ............................ 137/315 |
| 857,284 | 6/1907 | Huber ................................... 82/46 |
| 1,085,159 | 1/1914 | Raab .................................... 137/546 |
| 2,271,582 | 2/1942 | Dixon .................................. 82/4 C |
| 2,390,749 | 12/1945 | Swift ................................... 137/550 |
| 2,396,964 | 3/1946 | O'Brien ............................... 137/318 |
| 3,652,107 | 3/1972 | Tickett ................................ 137/318 |
| 3,665,953 | 5/1972 | Chronister ......................... 137/315 |
| 3,954,288 | 5/1976 | Smith ................................. 137/318 |

FOREIGN PATENT DOCUMENTS

| 236315 | 1/1925 | United Kingdom ................ 137/318 |
| 258047 | 9/1926 | United Kingdom ................ 137/315 |

Primary Examiner—Martin P. Schwadron
Assistant Examiner—James R. Shay
Attorney, Agent, or Firm—Kane, Dalsimer, Kane, Sullivan and Kurucz

[57] ABSTRACT

A structural kit for the installation of a flow regulator valve in pipeline without interruption of the fluid flow in the pipeline. To make precise cutting of the desired portion of the pipeline in simple cutting operation and to just fit the valve into the cut-away portion thereof, a plane of the ring-shaped gear having cutting tools is tilted against a plane perpendicular to the axis of the pipe so as to cut away the pipe section the upper portion of which is longer than that of the bottom portion thereof.

3 Claims, 19 Drawing Figures

4,527,586

STRUCTURAL KIT FOR THE INSTALLATION OF A FLOW REGULATOR VALVE

This is a continuation-in-part of application Ser. No. 316,821 Oct. 30, 1981, now abandoned, which is a division of Ser. No. 003,096, Jan. 12, 1979, now abandoned.

BACKGROUND OF THE INVENTION

This invention relates to a structural kit for the installation of a flow regulator valve in a pipeline at any desired location thereof. More particularly, the present invention relates to the structural kit for the installation of a flow regulator valve in an intermediary portion of a pipeline which is under operating pressure and has to be cut out comprising, a sealed housing which is air tight and fluid tight with respect to the ambient atmosphere and which confines a working space around the pipeline portion, a pipe cutter vertically movable in the working space and removable from the housing, said pipe cutter having a pair of ring-shaped gears which may be separated respectively into two sections to be set around the pipe and which have cutting tools on the side wall thereof to be slidably in the direction of the axis of the pipe, a device for driving the pipe cutter disposed outside of the housing, a shutoff valve for shutting off a vertical intermediary portion of the working space in the housing for partitioning the space clamping rings having packings on their inner circumference capable of being mounted on the pipeline at each longitudinal side of the installation area within the housing, clamping ring setters for displacing the clamping rings disposed outside of the housing along the pipeline for connecting a pipe end portion of the valve to the newly created line ends beyond the connecting end portion.

Various methods and structural kits are conventionally known for installation of a flow regulator valve in an underground pipeline, but there have not yet been developed the method or the structural kit as will make such installation work simple and easy allowing the work to be performed without interruption of the fluid flowing in the pipeline. Particularly, easy removal of the cut pipe piece and smooth insertion of the flow regulator valve have not yet been carried out prior to the present invention.

SUMMARY OF THE INVENTION

An object of this invention is to provide a structural kit for the installation of a flow regulator valve in pipeline without interruption of the fluid flow in the pipeline, which enables precise cutting of the desired portion of the pipeline in simple cutting operation in order to just fit the valve into the cut-away portion thereof.

To attain the object, the structural kit according to the present invention provided with the above mentioned basic construction, is characterized in that each of the said ring-shaped gear is such constructed that a plane of the ring-shaped gear is tilted against a plane perpendicular to the axis of the pipe so as to cut away the pipe section the upper portion of which is longer than that of the botton portion thereof.

Namely, since the said cutting tools may cut away the pipe piece having an upper portion longer than the bottom portion thereof, the cut pipe piece may be easily removed upwardly without engagement between the end surfaces of the cut pipe piece and the end surfaces of the cut-away portion of the pipe. Further, it may easily and smoothly insert the flow regulator valve into the cut-away portion since the space in the upper portion of the cut-away portion of the pipe is slightly larger than that of the flow regulator valve in the axial direction of the pipe.

Further, where the cutting tools are arranged to rotate by an axis thereof which is eccentric to the axis of the pipe, the bottom portion of the pipe is cut off earier than that of the upper portion . This causes that the fluid starts to flow out from such cut portion. The fluid flow direction in the housing becomes constant that then increase of the fluid in the housing as well as and disturbance of the fluid flow are controlled so that sluges cut off from the pipe may not go into the pipeline.

Other objects and advantages of the present invention will be apparent from the following detailed description.

BRIEF DESCRIPTION OF THE DRAWINGS

Drawings show, by way of example, some embodiments of the structural kit according to the invention and how the method is performed according to the invention for installing a flow regulator valve in a pipeline, wherein.

DETAILED DESCRIPTION OF THE PREFERRED EMBODIMENTS

Figure 1:
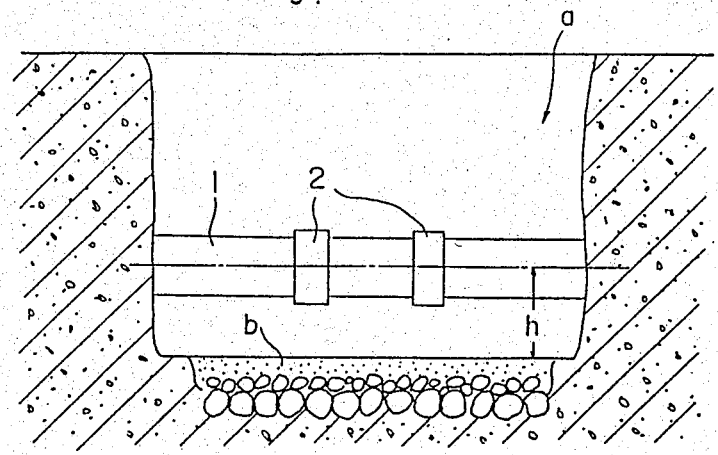
FIGS. 1–13 show the pipeline under the installation work consecutively at the respective stages.
Figure 2:
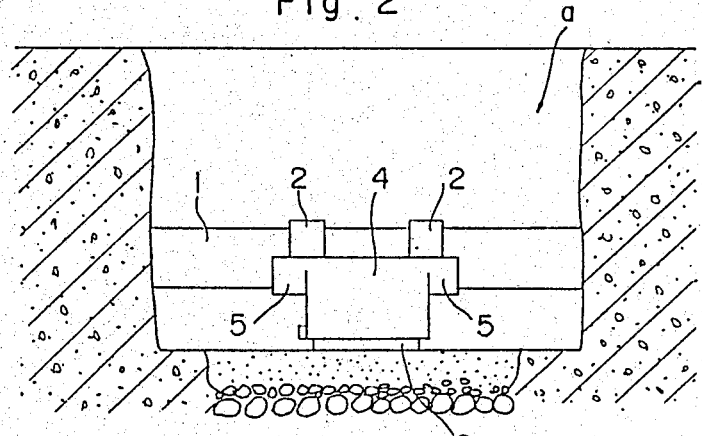

An embodiment of the method according to the invention is now described hereunder with reference to FIGS. 1–16. As seen in FIG. 1, soil is excavated around the portion of a pipeline 1 to be installed with a flow regulator valve 16 (FIGS. 10–13 and 16), to provide a foxhole or hollow space a of suitable depth around the exposed pipeline portion. The fluid flowing in the pipeline may for instance be supposed as water. Bottom of the space a is then tamped and consolidated as concrete base or foundation b having the top surface at a suitable distance h underneath the longitudinal axis of the pipeline 1. On either longitudinal lateral side of the said portion to be installed with the flow regulator valve there are now fitted around and upon the pipeline 1 respective retaining, anchor or clamping rings or bands 2 adapted for such free wrapping around and latching in place about the pipe even extending infinitely or endlessly, thus in segmented, sectional or split-type construction. Each of the rings 2 has two longitudinally distanced sealing means such for instance as O-rings 29, and is constructed to conveniently be put under pressureproof test of the sealing means 29 at this very initial or preparatory stage of the installation work. In order to enable the fitting, the sealing means 29 should initially be in cord form and should upon wrapping around the pipe be shaped up in endless form by adhesion. After confirming the proper sealing effect of the rings 2, a lower casing 4 to constitute lower portion of an entire casing assembly is brought in by means of any suitable hoisting means such as a crane in the case of large dimension and thus heavy weight application, put upon the concrete base b via an adjustable platform 6 and is held in proper alignment with the pipeline 1 by adjusting the platform 6, as seen in FIG. 2.

Figure 3:
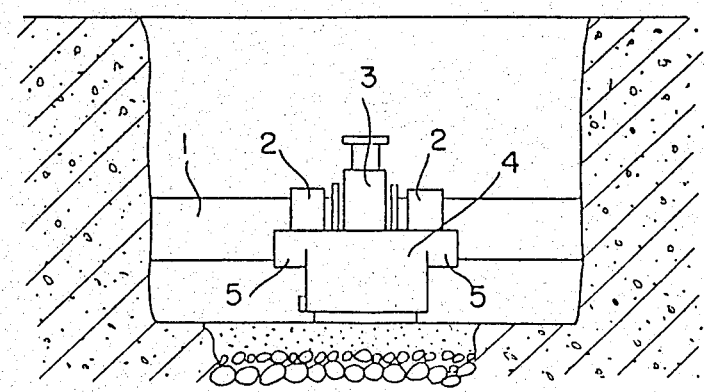
Figure 9:
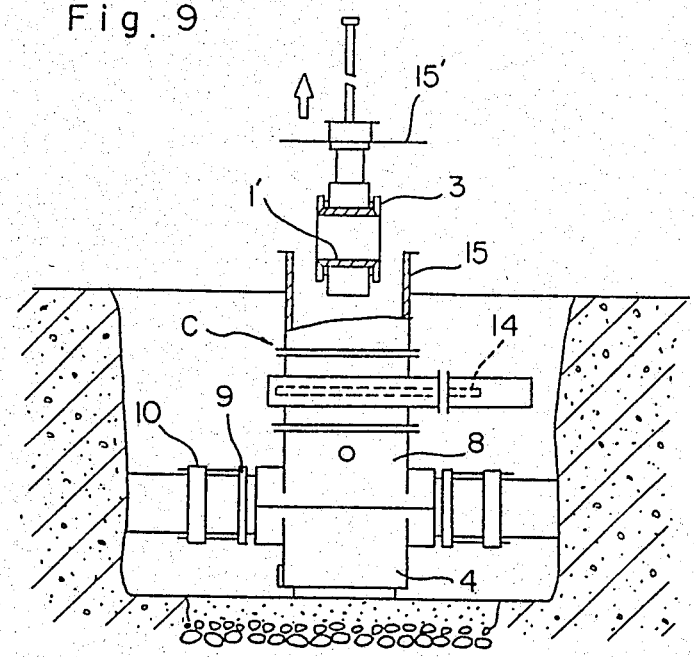
Figure 14:
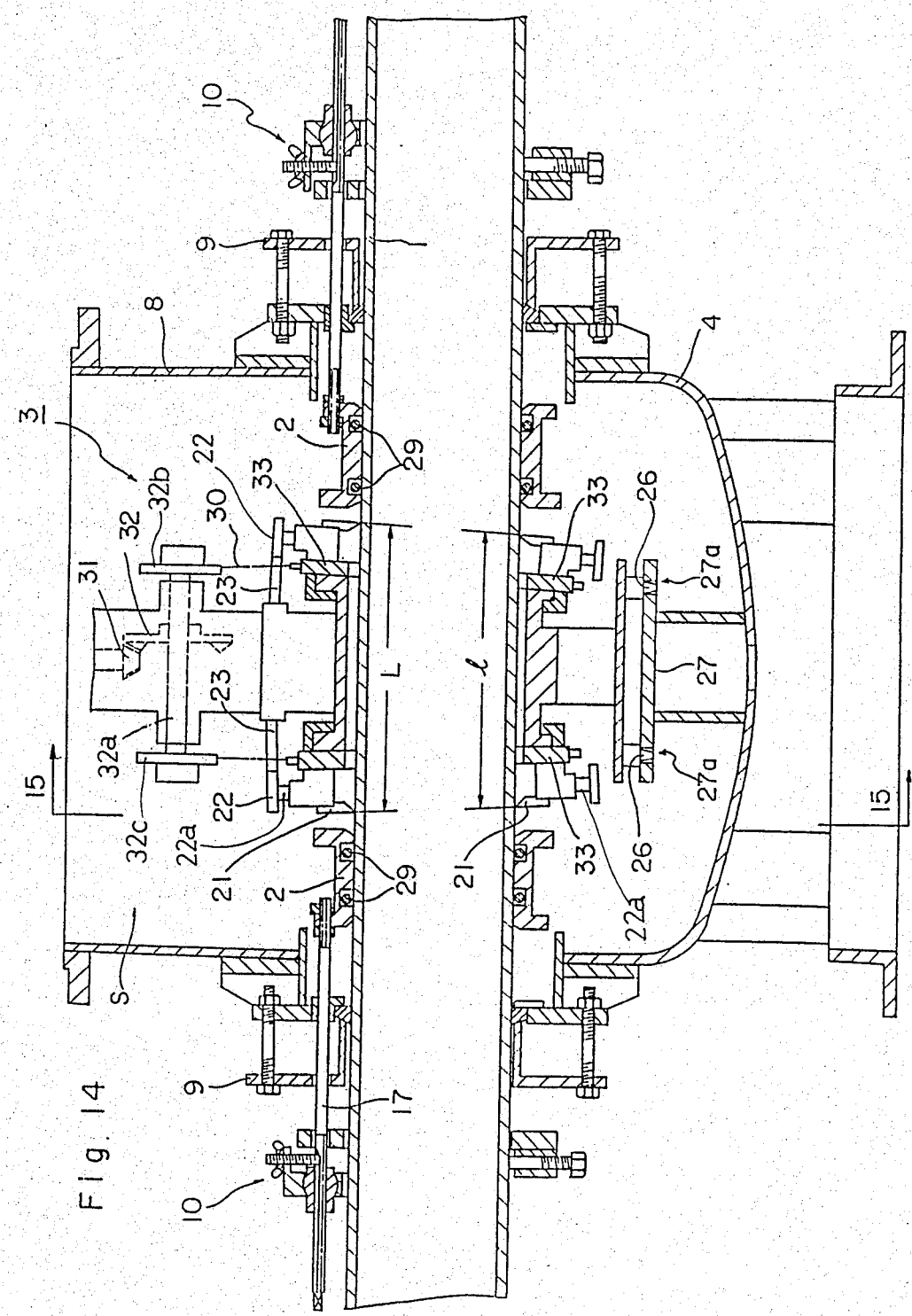
FIG. 14 is an enlarged side elevation in longitudinal section showing the structural kit according to the invention, including a pipe-cutter, fitted on the pipeline.
Figure 15:
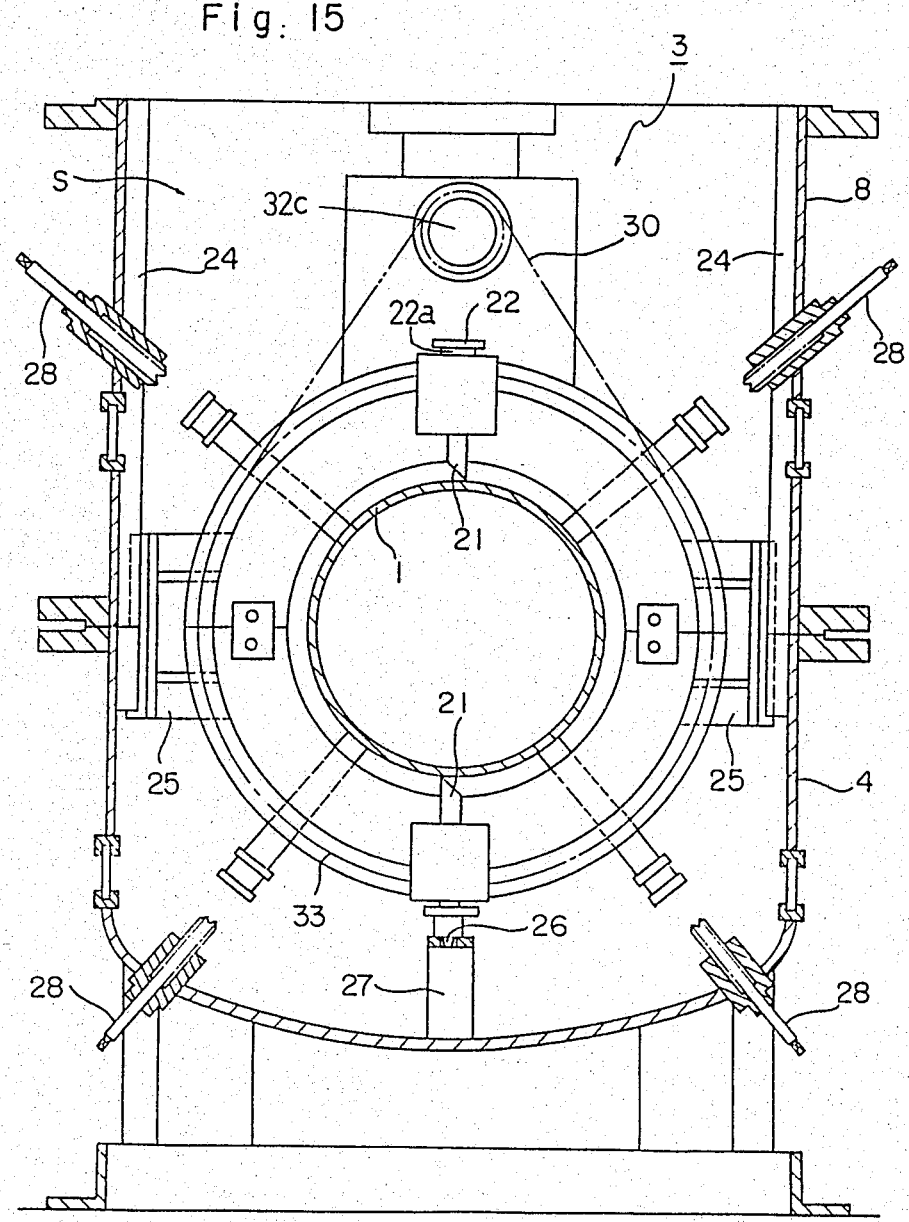
FIG. 15 is a cross-sectional view taken on line 15—15 in FIG. 14.
Figure 16:
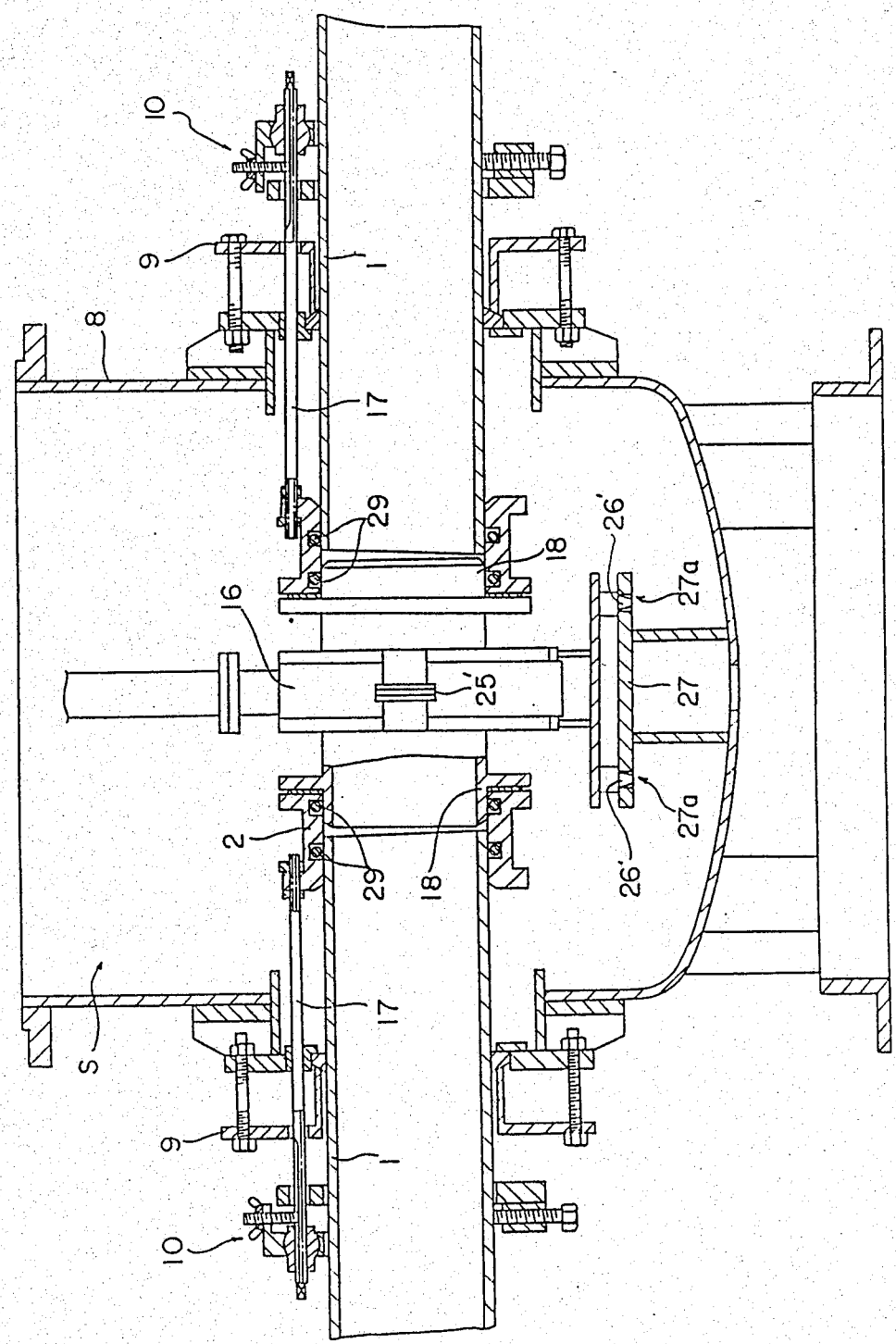
FIG. 16 is a view similar to FIG. 14 but at a later stage of the installation work, showing the flow regulator valve put in alignment with the pipeline.

Then, lower section of a pipe-cutter 3 is first introduced in between the lower casing 4 and the pipeline 1, and the remaining upper portion is mounted thereon thus to set up the pipe-cutter 3 around the pipe portion to be cut off, as seen in FIG. 3. In order to keep the setting in proper location, there are provided on either transversal lateral side of the pipe-cutter 3, as seen in FIG. 15, respective vertical guide plates or fins 25 secured by any suitable means for instance as fixing screws, for free sliding engagement with the complementary guide channels 24 provided on the inner surface of the lower casing 4, thus to keep the pipe-cutter 3 always in lateral alignment therewith, and there are further provided lugs 26, as seen in FIGS. 14 and 15, protruding in downwardly pointed taper shape on the bottom of the pipe-cutter 3, to be received in the complementary recesses or holes 27a in a base plate 27 secured to the bottom of the lower casing 4, thus to securely set the height level of the pipe-cutter 3 relative to the longitudinal axis of the pipeline 1. As the actual process of realizing the proper setting with respect both to the lateral position and the height level, the pipe-cutter 3 is first set up and mounted in the lower casing 4 as guided as above, and subsequently thereto the platform 6 is adjusted to keep the height level of the lower casing 4 with respect to the pipeline 1 without fluctuation. The pipe-cutter 3, constructed in two sections each to envelope the pipeline 1 circumferentially halfways, to then make up the complete wrapping therearound when assembled to an entirety, has on either end side in the longitudinal direction of the pipeline 1 respective sets of the cutting tools 21 driven in the illustrated instance by means of the respective sprocket chains 30 with driving gears 31, 32, 33 etc. for rotation all around the pipeline 1. Each of the sets is illustrated to have a pair of circumferentially diagonally arranged cutting tools 21, but the number is not limited to that. Plane of the rotation of each set of the cutting tools 21 is made slightly angled from the vertical in an opposite direction with respect to one set from the other, as seen in FIG. 14, so that the distance L along the longitudinal axis of the pipeline 1 between the two sets of the tools 21 when on top of the pipe is slightly larger than the corresponding distance l thereof when on bottom of the pipe. Such slant cutting of the pipeline 1 is to facilitate the work of lifting up or removing the pipe-cutter 3 together with the cut pipe section 1', as seen in FIG. 9, upon completion of cutting the pipeline 1, when the cut pipe section 1' is apt to be axially somewhat compressed from both sides of the remaining pipeline 1.

Figure 4:
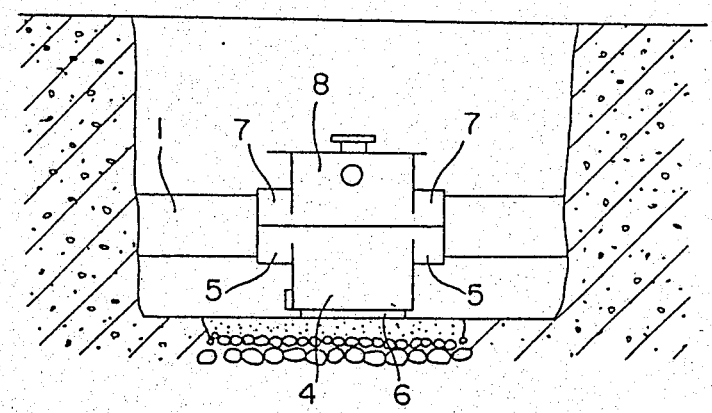
Figure 5:
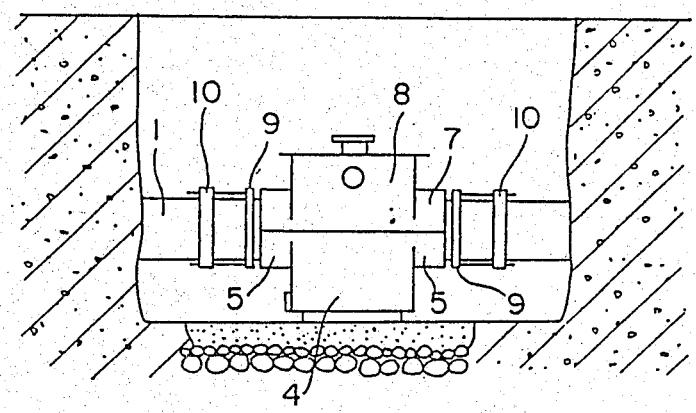
Figure 6:
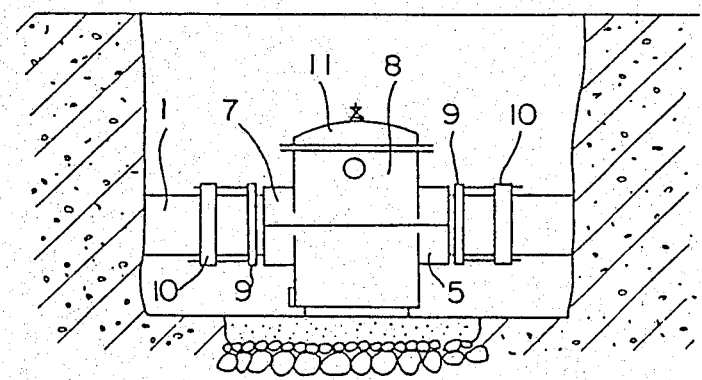

Proceeding with the work now as seen in FIG. 4, a middle casing 8 with connection flanges 7 to engage with counterpart flanges 5 of the lower casing 4 is mounted on to the lower casing 4, and the adjustable platform 6 is upon need readjusted to properly fix up the position of the casing assembly 4, 8 relative to the pipeline 1. To proceed further, reference should be made to FIGS. 5 and 14. Here, gland sustainers 9 to urge and sustain on either side respective suitable sealing members inserted in between the pipeline 1 on one hand and the flanges 5 and 7 of the lower and middle casings 4 and 8, respectively, on the other hand, as well as clamping-ring setters 10 to be used for slidingly forcing the clamping rings 2 inwardly of the casing assembly 4, 8 along the pipeline 1, with actuator means 17 penetrating through the gland sustainers 9, are securely fitted on the pipeline 1. Furthermore, a plurality of threaded rods 28 extending radially of the pipeline 1 as seen in FIG. 15 are adjustably threaded in support sleeves with complementary female threading as secured on to the casing assembly 4, 8 to thereby sustain the pipe-cutter 3. Upon reaching the said stage as illustrated in FIG. 5, a sealing lid 11 may be put on top of the middle casing 8 as seen in FIG. 6, in order to check pressureproof tightness of all the sealing portions by introducing water into the closed casing assembly 4, 8 and pressurizing same. Confirming the satisfactory sealing, the lid 11 is removed and the water is discharged.

Figure 7:
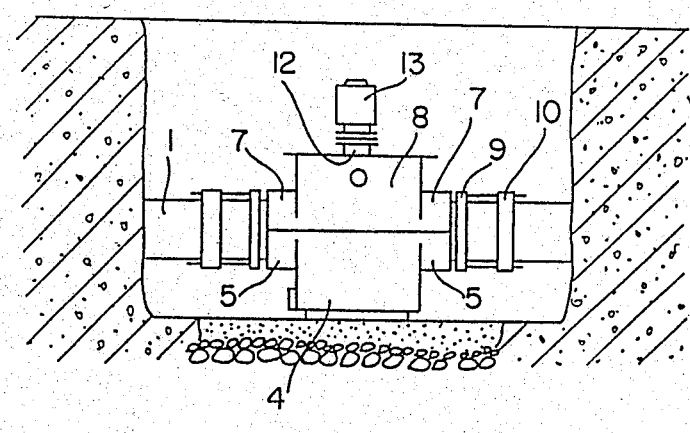
Figure 8:
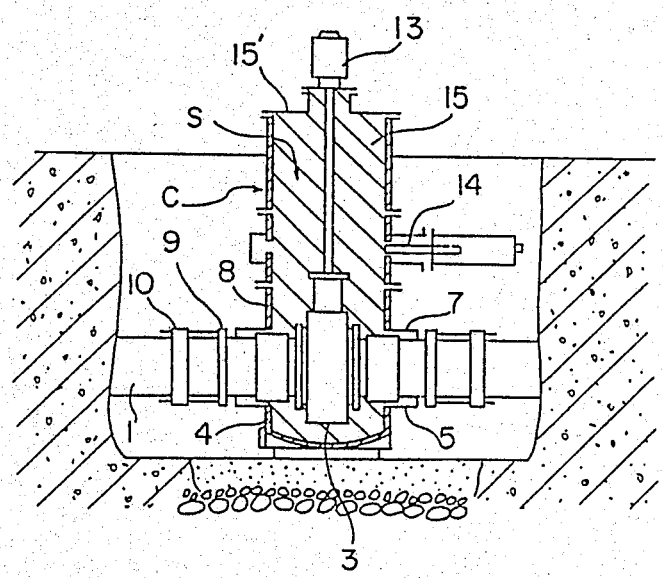

Now, driving means 13 for the pipe-cutter 3, such as an electric motor as illustrated in FIG. 7, is fixed on to the drive shaft 12, and by actuating the cutting-tool-driving mechanism, prelimary cutting of the pipeline 1 wall is effected to an extend restrained under visual watching from outside not to cause complete incision through the wall. Means for radially consecutively lowering down the cutting tools 21 as illustrated in FIGS. 14 and 15 includes, for each tool, a cam wheel 22 defining the radial position of the tool 21 in response to the wheel rotation about its axis as is consecutively actuated every time the cam wheel 22 is hit by a stationary pin 23 fixed on to the pipe-cutter 3 proper, thus to radially consecutively lower the tool by one predetermined pitch distance per every circumferential rotation of the tool 21. Normally, it is preferable to cut off approximately two thirds of the pipe wall thickness as the preliminary cutting, and upon completion thereof, the driving means 13 is removed for the time being in order to proceed to the next stage as illustrated in FIG. 8. Thus, a shut-off valve 14 is secured on top of the middle casing 8, and furthermore an upper casing 15 is secured on top of the shut-off valve 14. Still further, the upper casing 15 is covered up by a top cover 15', and the driving means 13 is ultimately mounted on top thereof, with an intermediary shaft interconnecting the driving means 13 and the shaft 12 of the pipe-cutter 3 mentioned hereinabove with reference to FIG. 7. In this stage, the shut-off valve 14 is in its retracted open position not to interfere the intermediary shaft.

As is thus illustrated in FIG. 8, completed around and upon the pipeline 1 at the portion to be installed with a flow regulator valve 16 (FIGS. 10–13 and 16) is a casing C comprising the lower casing 4, middle casing 8, shut-off valve 14, upper casing 15 and top cover 15' and confining a work space S sealed off the ambient atmosphere air-tight and liquid-tight as is perfected by the gland sustainers 9 and the clamping-ring setters 10. The shut-off valve 14 can constitute a partition to split up the work space S into upper and lower portions and may be retracted to make the two portions freely communicate with each other.

The entire operations covering the stages illustrated in FIGS. 2–8 are referred to in this specification generally as the first step.

Figure 10:
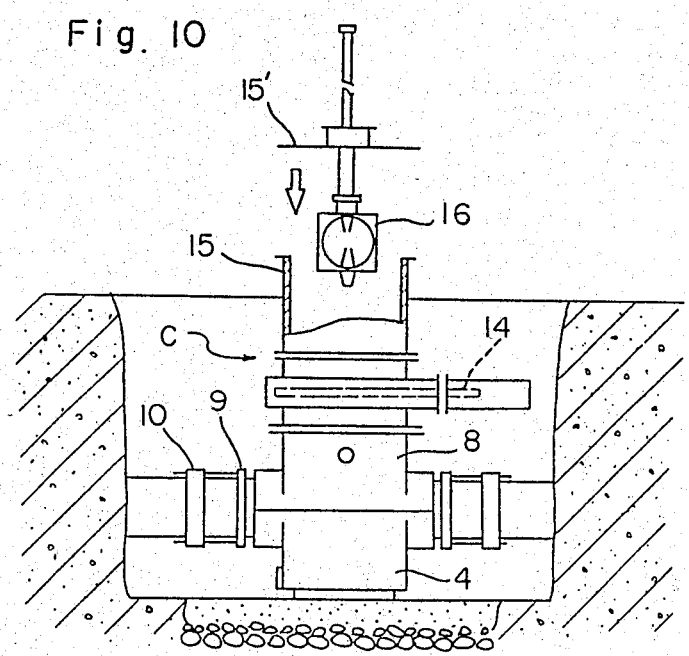
Figure 11:
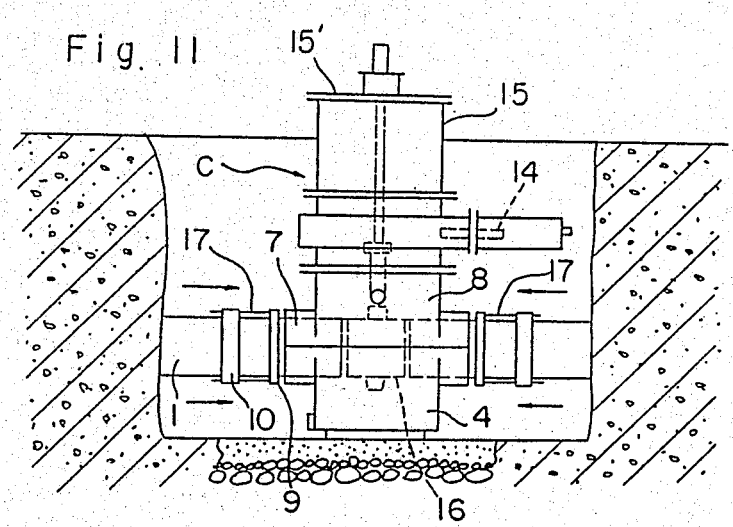

In this state, with the shut-off valve 14 retracted, the pipe-cutter 3 is driven by actuating the driving means 13, to cut off the pipeline 1. Though the pipe was hereinbefore described as has gone through the preliminary cutting, such may as well be omitted. Complete cutting off of the pipeline 1 is referred to as the second step. A casing of the pipe-cutter 3 is separable into upper and lower parts at the portions thereof through which a level line passing an axis of the pipe 1, passes, as is seen in FIG. 15. The upper and lower parts of the casing are shown as connected to each other by means of plates and bolts. A pair of ring-shaped gears 33 or sprocket wheels, which drive a pair of cutting tools 21 around the pipe 1, are separable in the same manner as the casing. These gears 33 may be mounted on the casing to be rotatable. The upper part of the casing of the pipe-cutter 3 includes a transmitting shaft $32a$ which is parallel to the pipe 1 and on both ends of which sprocket wheels $32b$ and $32c$ are fixed. A pair of sprocket chains 30 are trained on the sprocket wheels $32b$ and $32c$ and the gears 33. The transmitting shaft $32a$ has a bevelgear 32 which is engaged with a pinion gear 31 which is mounted on one end of a drive shaft 12, the other end of which is connected to driving means 13, such as an electric motor. As shown in FIGS. 14 and 15, a pair of casings of cutting tools 21 are fixed to the side walls of each of the gears 33 and the cutting tools 21 per se are mounted thereon slidably in the direction of the axis of the pipe 1. The slidable construction of each of the cutting tools 21 has a threaded portion which is threadedly engaged with a cam shaft $22a$ which is mounted rotatably on the casing of the cutting tool 21 and which at one end thereof has a cam wheel 22. A pair of stationary pins 23 are so positioned and fixed onto the upper part of the casing of the pipe-cutter 3 with one end of each of them that the cam wheels 22 may be rotated by hitting the other free ends of the stationary pins 23 when the gears 33 provided with the cam wheels 22 of the cutting tools 21, rotate around the pipe 1. Accordingly, one rotation of the gear 33 moves the cutting tool 21 per se by a predetermined pitch in the direction of the axis of the pipe 1 so that the continuing rotation of the gear 33 may sever the pipe 1 gradually. Accordingly, when the driving means 13 is operated, the gear 33 rotates around the pipe 1 by means of the aforementioned driving system and therefore the cutting tools 21 attached to the gears 33 may sever the pipe 1. Thereupon, the pipe-cutter 3, together with the cut pipe section 1' held therein, is lifted up with the guide fins 25 thereof (already described referring to FIG. 15) sliding in the guide channels 24 extending in alignment throughout the casing sections 4, 8, 14, 15, to come up within the upper casing 15, and then the shut-off valve 14 is securely shut up. This is referred to as the third step. Since the fluid in the pipeline 1, for instance water, is flowing normally under positive pressure, jetting out of water will occur when the pipe wall is cut through, as will proceed in gradual manner in view of actual eccentricity between the pipeline 1 and the cutter 3, but the casing C, especially the portion of the lower casing 4 and the middle casing 8, covers up the water and ensures continuous flow even during this work. As seen in FIG. 9, the driving means 13 is then dismantled and the top cover 15' together with the pipe-cutter 3 as fitted thereto is disconnected from the upper casing 15 and lifted up for dismantling the pipe-cutter 3. Thereafter, a flow regulator valve 16 (also see FIGS. 12 and 16) is introduced as seen in FIG. 10 to replace the removed pipe-cutter 3, and the top cover 15' is refitted on to the upper casing 15. The removal of the pipe-cutter 3 from the upper casing 15 and introduction of the regulator valve 16 in place thereof is referred to as the fourth step. Upon refitting the top cover 15', the shut-off valve 14 is again retracted open and the flow regulator valve 16 is then lowered down with the guide fins 25' thereof (FIG. 16) sliding in the already described guide channels 24 throughout the casing sections 4, 8, 14, 15, to come in alignment with the cut pipeline 1, just reversing the previous procedure of lifting up the pipe-cutter 3. As for the alignment, centering in the transversal direction of the pipeline 1 is automatically attained by said sliding engagement of the guide fins 25' with the guide channels 24, care being paid to construct the flow regulator valve 16 and the pipe-cutter 3 with their center axes identically located with each other with respect to their guide fins 25' and 25. Height level of the flow regulator valve 16 is also automatically set by fitting, in the already described recesses or holes $27a$ in the base plate 27 of the lower casing 4 (FIG. 16), lugs 26' protruding in downwardly pointed taper shape on the bottom of the flow regulator valve 16. Proper alignment of the flow regulator valve 16 is thus completed quite easily. The proper coaxial setting down of the regulator valve 16, preceded by reopening the shut-off valve 14, is referred to as the fifth step. In this stage, rods or actuator means 17 of the clamping-ring setters 10 are actuated from outside the casing C on either side, as illustrated by the arrows in FIG. 11, to be forced into the cut pipe portion, penetrating through the gland sustainers 9 fitted on the flanges 5 and 7 of the lower and middle casings 4 and 8, so that the clamping rings 2 are forced inwardly of the casing C, to come to straddle over the respective jointing portions of the pipeline 1 and the connecting end pipe portions 18 of the flow regulator valve 16. As has already been mentioned, each of the clamping rings 2 has two longitudinally distanced sealing means 29, and one of them now bears on the connecting and pipe portion 18 of the flow regulator valve 16, while the other remaining on the uncut portion of the pipeline 1, thus to establish provisional jointing of the regulator valve 16 and the pipeline 1. For this purpose, the connecting end pipe portions 18 are made to have substantially the same outer diameter and preferably also the same inner diameter as the pipeline 1, and the clamping rings 2 are made to have the inner diameter substantially the same as the common outer diameter of the connecting end pipe portions 18 and the pipeline 1. This provisional jointing by means of the clamping rings 2 is the step characteristic of the invention.

Upon completion of the said provisional jointing, water as may be present within the casing C is drained off, and an operator or operators enter into the casing C, in the case of large dimension application, through securely sealable manhole provided in the upper casing 15 though not illustrated, for performing there the work of disconnecting the intermediary shaft from the flow regulator valve 16. Then the upper casing 15, shut-off valve 14, clamping-ring setters 10, gland sustainers 9, middle casing 8 and lower casing 4 are dismantled in this order, and all the auxiliary fittings as may have been mounted on to the flow regulator valve 16, such for instance as guide flanges, are also dismantled and removed. The entire dismantling and removal is referred to as the sixth step. Now, the clamping rings 2 are circumferentially securely fastened up and are ultimately fixed up, for instance bolted up, on to the flow regulator valve 16.

Figure 12:
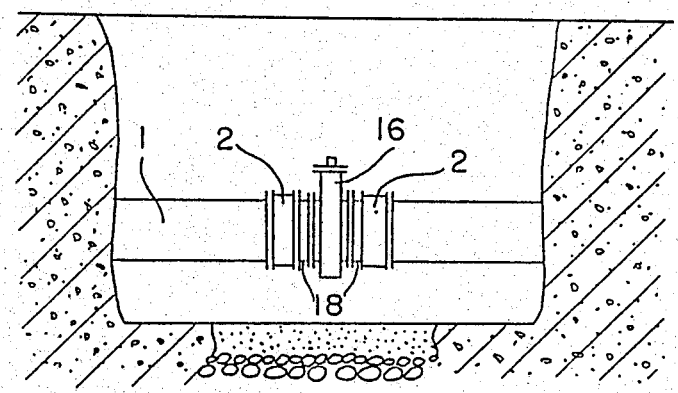
Figure 13:
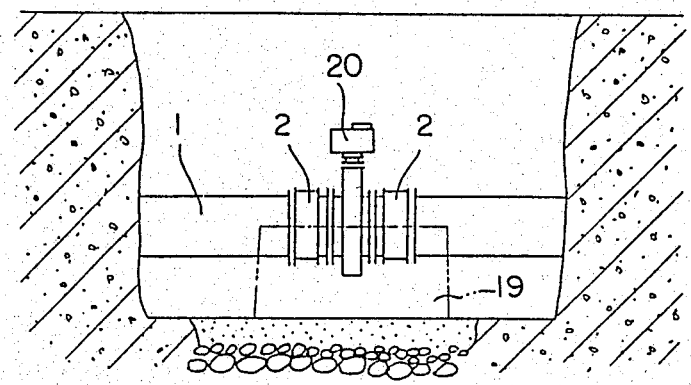

Rough outer configuration at this stage is as seen in FIG. 12, and now as seen in FIG. 13 a base support concrete block 19 is formed to protect the joints, and means 20 for opening and closing the valve 16 is fitted. It is supposed that the regulator valve 16 has been kept in its open position throughout all the installation work.

Functions obtained by the method and the equipment described hereinabove in installing the flow regulator valve may in summary be itemized as follows:

(1) The fluid flowing out of the pipe when the pipeline is cut through by the pipe-cutter is securely prevented, by the fully sealed casing, from escaping into the ambient free atmosphere, and is temporarily confined in the casing to ultimately flow out smoothly downstream in the pipeline.

(2) Escaping of the fluid into the ambient atmosphere is securely prevented even when the pipe-cutter together with the cut pipe section as held therein is lifted up to upper portion of the work space and further removed completely out of the casing, since the said upper portion of the work space is securely sealed up or partitioned from the lower portion thereof by means of the shut-off valve prior to the said subsequent complete removal.

(3) From the same reason as in paragraph 2 just above, escaping of the fluid into the ambient atmosphere is also securely prevented even when the flow regulator valve is introduced into the said upper portion of the work space.

(4) Though the shut-off valve is retracted open when the flow regulator valve is further lowered into the lower portion of the work space, the casing is then in its fully sealed state and thus escaping of the fluid into the ambient atmosphere is also here securely prevented from the same reason as in paragraph 1 above.

(5) Since the clamping rings are brought in place to straddle over the respective joints of the connecting end pipe portions on either longitudinal side of the flow regulator valve and the pipeline, with sealing means fitted on the inner surface of the clamping rings, later dismantling and removal of the casing does not affect the smooth flow of the fluid from upstream to downstream through the flow regulator valve in its open position. It is true that the fluid confined within the casing outside the flow regulator valve and pipeline will be spilt into the ambient atmosphere or else should be drained off, but such fluid is of small amount and can easily be disposed of.

The flow regulator valve may thus be installed in a pipeline at any desired location with advantages 1–5 as above without interruption of the fluid flow in the pipeline.

Since the operation of bringing in place the clamping rings to straddle over the joints as mentioned above in paragraph 5 is made possible according to this invention to be effected from outside the casing without breaking the proper sealing, the provisional jointing is made quite easy even though the inner space of the casing may be filled with the fluid, and the said secure provisional jointing is the characteristic feature, as also mentioned in said paragraph 5, to result in the secure prevention of the flowing bulk of the fluid from coming out into the ambient atmosphere even when the casing is dismantled and removed.

Figure 17:
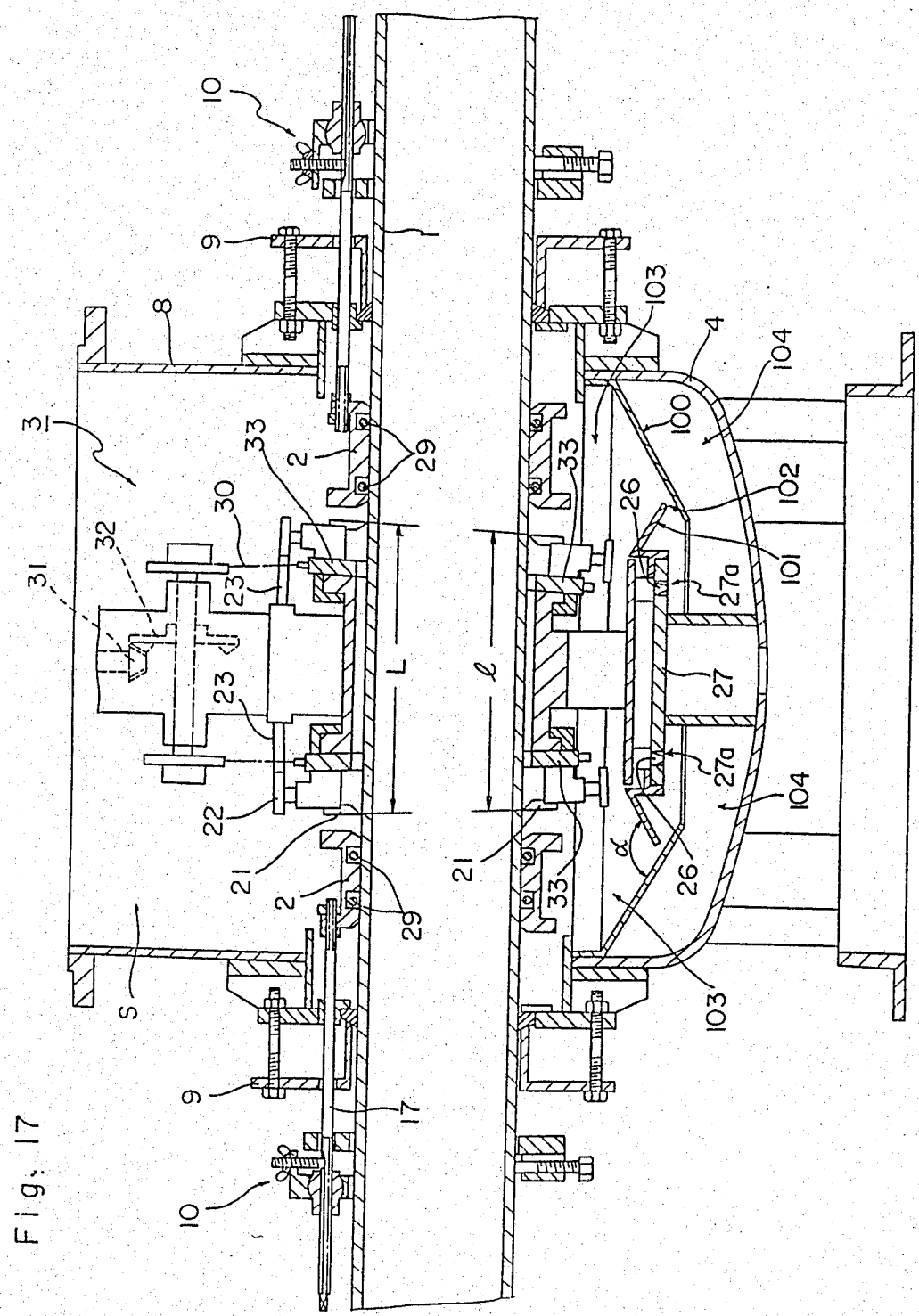
FIG. 17 is a view also similar to FIG. 14, but showing a developed embodiment of the structural kit with a casing in double-bottom construction.

Referring now to FIG. 17, a modified embodiment of the equipment to be used for performing the method of the invention is described hereunder. Like parts as shown in FIG. 14 in the previous embodiment are designated by like reference numerals, and description thereof is omitted. Here, an inclined plate 100 substantially in funnel shape is provided as affixed to bottom portion of the lower casing 4. Another inclined plate 101 also substantially in funnel shape but in inclination opposite to that of the said inclined plate 100 is provided as affixed to the base plate 27 of the lower casing 4. Upwardly open angle between the slopes of the two inclined plates 100 and 101 is made to be obtuse, i.e. larger than 90°. Between the two inclined plates 100 and 101 there is formed a narrow annular clearance 102 making communication in between upper and lower portions 103 and 104, respectively, of the lower casing 4 in such double-bottom construction in zigzag manner. With this construction, the dusts or fragments chipped off at cutting the pipeline 1, as well as the fluid flowing out of the pipe after complete incision of the wall, will fall down upon the inclined plates 100, 101, and the chipped dusts of the density supposed to be greater than that of the fluid which again is supposed to be water, as is normally the case, will smoothly settle down and be retained in the said lower bottom portion 104 thus without blotting upper portion of the working space S and in the worst case re-entering into the cut-open pipeline 1 after the pipe-cutter 3 is lifted up, though the fluid may fall down in splash from the cut pipe.

Figure 18:
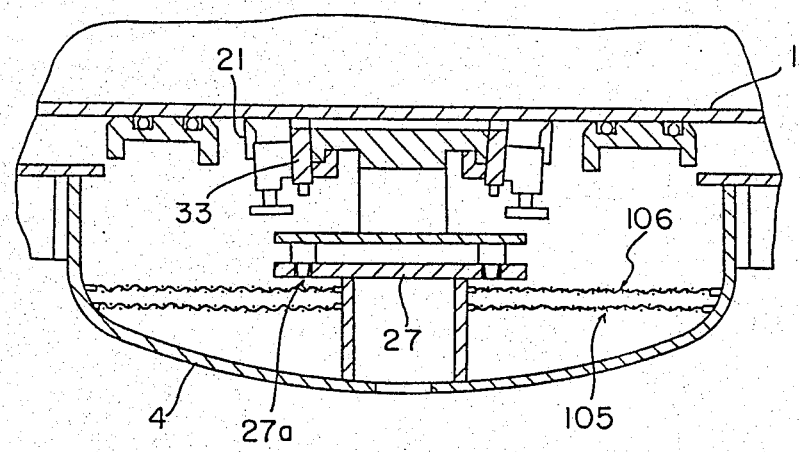
FIG. 18 is a fragmentary cross-sectional view showing lower portion of the casing similar to FIG. 17 but in still another embodiment of the multiple-bottom construction.

FIG. 18 shows a modified construction of such multiple-bottom. Perforated screen or netting means, in two-layer 105, 106 construction in the illustrated instance, is provided within the lower casing 4.

Figure 19:
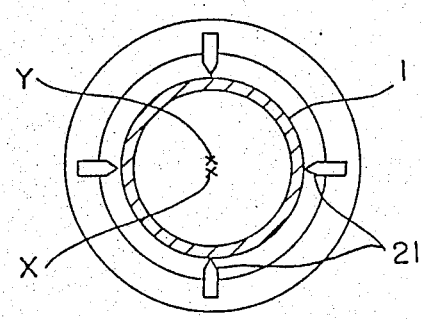
FIG. 19 is a cross-sectional view of the pipeline with cutting tools of the pipe-cutter as fitted eccentrically on the pipeline.

FIG. 19 schematically shows eccentric setting of the pipe-cutter 3 with respect to the pipeline 1, as is preferable in this invention. As seen, axis Y of rotation of the cutting tools 21 is set here to be slightly above the longitudinal axis X of the pipeline 1. With this construction, incision of the pipe wall starts from the bottom or the lowest portion of the pipe and the fluid starts flowing out from such portion. Therefore, the fluid flow direction in the housing becomes constant and then increase of the fluid in the housing as well as disturbance of the fluid flow are controlled so that sludges cut off from the pipe may not go into the pipe-line. In practice, the rotation axis Y of the tools 21 may eccentrically be set slantly upwardly or even laterally aside of the axis X of the pipeline 1. The eccentric spacing may be about 2 mm or even less than 1 mm, what is essential being only that the spacing should not be larger than the pipe wall thickness.

Though the invention has been illustrated and described in detail in some specific preferred embodiments, it is clear that the various modifications may advantageously be adopted without departing from the spirit of the invention.

We claim:

1. Structural kit for the installation of a flow regulator valve in an intermediary portion of a pipeline which is under operating pressure comprising, a sealed housing which is air tight and fluid tight with respect to the ambient atmosphere and which confines a working space around the pipeline portion, a pipe cutter for cutting out a section of the pipeline, said pipe cutter being vertically movable in the working space and removable from the housing, said pipe cutter having a pair of ring-shaped gears which may be separated respectively into two sections to be set around the pipe and which have cutting tools on the side wall thereof which are slidable in the direction of the axis of the pipe, a device for driving the pipe cutter disposed outside of the housing, a shut-off valve for shutting off a vertical intermediary portion of the working space in the housing for partitioning the space, clamping rings having packings on their inner circumference capable of being mounted on the pipeline at each longitudinal side of the installation area within the housing, clamping-ring setters disposed outside of the housing along the pipeline for displacing the clamping rings along the pipeline for connecting the flow regulator valve to the line ends created when the pipe section is cut out, characterized in that each of the said ring-shaped gear is such constructed that a plane of the ring-shaped gear is tilted against a plane perpendicular to the axis of the pipe so as to cut away the pipe section the upper portion of which is longer than that of the bottom portion thereof.

2. Structural kit in accordance with claim 1 wherein the said cutting tools are arranged eccentrically to make a cutting circle the center of which is located substantially upwards the axis of the pipe so as to finish the cutting of the bottom portion of the pipe slightly earlier than the upper portion thereof.

3. Structural kit in accordance with claim 2 further comprising two inclined plates disposed at the bottom of the housing to make a double-bottom construction which defines a clearance between the plates and the bottom of the housing so as to keep in the clearance sludges, dusts or fragments cut off from the pipe once those have flown therein.

* * * * *